US012603276B2

(12) United States Patent
Washida et al.

(10) Patent No.: US 12,603,276 B2
(45) Date of Patent: Apr. 14, 2026

(54) ACTIVE MATERIAL, AND POSITIVE ELECTRODE MIXTURE AND SOLID-STATE BATTERY THAT USE SAID ACTIVE MATERIAL

(71) Applicant: MITSUI MINING & SMELTING CO., LTD., Tokyo (JP)

(72) Inventors: Daisuke Washida, Ageo (JP); Hitohiko Ide, Ageo (JP); Tetsuya Mitsumoto, Takehara (JP); Jun Omura, Ageo (JP); Yasuo Komoda, Ageo (JP); Yasuhiro Shibata, Ageo (JP); Yasunori Tabira, Ageo (JP); Tomoyuki Maeda, Ageo (JP)

(73) Assignee: MITSUI KINZOKU COMPANY, LIMITED, Tokyo (JP)

( * ) Notice: Subject to any disclaimer, the term of this patent is extended or adjusted under 35 U.S.C. 154(b) by 736 days.

(21) Appl. No.: 17/056,339

(22) PCT Filed: Sep. 27, 2019

(86) PCT No.: PCT/JP2019/038154
§ 371 (c)(1),
(2) Date: Nov. 17, 2020

(87) PCT Pub. No.: WO2020/067425
PCT Pub. Date: Apr. 2, 2020

(65) Prior Publication Data
US 2021/0234158 A1 Jul. 29, 2021

(30) Foreign Application Priority Data
Sep. 27, 2018 (JP) ................................. 2018-182980

(51) Int. Cl.
H01M 4/36 (2006.01)
H01M 4/505 (2010.01)
(Continued)

(52) U.S. Cl.
CPC ........... H01M 4/366 (2013.01); H01M 4/505 (2013.01); H01M 4/525 (2013.01); H01M 4/62 (2013.01);
(Continued)

(58) Field of Classification Search
CPC ...... H01M 4/366; H01M 4/505; H01M 4/525; H01M 4/62; H01M 10/0562;
(Continued)

(56) References Cited

U.S. PATENT DOCUMENTS

2007/0202405 A1* 8/2007 Shizuka ................ H01M 4/505
429/223
2007/0231694 A1 10/2007 Abe
(Continued)

FOREIGN PATENT DOCUMENTS

CN 101790496 7/2010
CN 103124695 A 5/2013
(Continued)

OTHER PUBLICATIONS

Wang et al. "High-Conductivity Argyrodite Li6PS5Cl Solid Electrolytes Prepared via Optimized Sintering Processes for All-Solid-State Lithium-Sulfur Batteries." ACS Appl. Mater. Interfaces 2018, 10, 42279-42285 (Year: 2018).*
(Continued)

*Primary Examiner* — Michael L Dignan
(74) *Attorney, Agent, or Firm* — NIXON & VANDERHYE

(57) ABSTRACT
Disclosed is an active material that can reduce an interface resistance with a sulfide solid electrolyte and improve the battery performance. The active material exhibits at least one peak in the range of from 0.145 nm to 0.185 nm and at least one peak in the range of from 0.28 nm to 0.31 nm in a radial distribution function obtained through measurement
(Continued)

of an X-ray absorption fine structure of the active material. The active material is for use in a solid-state battery. The active material preferably has a core particle, and a coating layer located on the surface of the core particle.

11 Claims, 4 Drawing Sheets

(51) Int. Cl.

| | |
|---|---|
| *H01M 4/525* | (2010.01) |
| *H01M 4/62* | (2006.01) |
| *H01M 10/0562* | (2010.01) |
| *H01M 10/0585* | (2010.01) |
| *H01M 4/02* | (2006.01) |

(52) U.S. Cl.
CPC ... *H01M 10/0562* (2013.01); *H01M 10/0585* (2013.01); *H01M 2004/028* (2013.01); *H01M 2300/0068* (2013.01)

(58) Field of Classification Search
CPC ....... H01M 10/0585; H01M 2004/028; H01M 2300/0068; H01M 4/483; H01M 10/052; H01M 4/131; C01P 2002/32; C01P 2004/61; C01P 2004/84; C01P 2006/12; C01P 2006/80; C01P 2006/82; C01G 53/50; Y02E 60/10; Y02P 70/50
See application file for complete search history.

(56) References Cited

U.S. PATENT DOCUMENTS

| | | | |
|---|---|---|---|
| 2011/0059363 A1 | 3/2011 | Imanari et al. | |
| 2013/0209890 A1 | 8/2013 | Nagatomi | |
| 2014/0339465 A1* | 11/2014 | Okamoto | C01G 45/1228 |
| | | | 252/182.1 |
| 2016/0043391 A1 | 2/2016 | Nagatomi | |
| 2016/0211519 A1* | 7/2016 | Uchiyama | H01M 4/0404 |
| 2016/0315324 A1* | 10/2016 | Miki | H01M 4/525 |
| 2018/0212233 A1* | 7/2018 | Ito | H01M 10/0562 |
| 2018/0219229 A1 | 8/2018 | Miki | |
| 2021/0135199 A1 | 5/2021 | Washida et al. | |

FOREIGN PATENT DOCUMENTS

| | | |
|---|---|---|
| EP | 2 174 915 | 4/2010 |
| JP | H11-297323 | 10/1999 |
| JP | 2006-261072 | 9/2006 |
| JP | 2007-330877 | 12/2007 |
| JP | 2009-032655 | 2/2009 |
| JP | 2015-153628 | 8/2015 |
| JP | WO2014007357 A1 | 6/2016 |
| JP | 2016-207567 A | 12/2016 |
| KR | 20070098562 A | 10/2007 |
| KR | 10-2010-0037599 | 4/2010 |
| KR | 20180087102 A | 8/2018 |
| TW | 200920699 | 5/2009 |
| WO | 2009/005164 | 1/2009 |
| WO | 2018/164224 | 9/2018 |
| WO | 2019/035418 A | 2/2019 |

OTHER PUBLICATIONS

Ohta et al. "LiNbO3-coated LiCoO2 as cathode material for all solid-state lithium secondary batteries." Electrochemistry Communications 9 (2007) 1486-1490 (Year: 2007).*

Li et al. "LiNbO3-coated LiNi0.8Co0.1Mn0.102 cathode with high discharge capacity and rate performance for all-solid-state lithium battery." Journal of Energy Chemistry 40 (2020) 39-45 (Year: 2019).*

International Search Report for PCT/JP2019/038154 dated Dec. 3, 2019, 5 pages.

Written Opinion of the ISA for PCT/JP2019/038154 dated Dec. 3, 2019, 5 pages.

Tsai et al., "Defect structure of highly Zn-doped LiNbO3 single crystal revealed by extended X-ray absorption spectra", Applied Physics Letters, Applied Physics Letters, 2008, vol. 92, No. 16, Article No. 161902 (4 total pages).

Office Action, issued in Korean Patent Application No. 10-2020-7031998 dated Oct. 18, 2024.

* cited by examiner

Example 9

Example 10

Comparative Example 1 r / nm

Example 1

Second derivative (after differentiating initial function twice)

Example 1

Initial function 0.1   0.11   0.12   0.13   0.14   0.15   0.16   0.17   0.18   0.19   0.2 r / nm

ACTIVE MATERIAL, AND POSITIVE ELECTRODE MIXTURE AND SOLID-STATE BATTERY THAT USE SAID ACTIVE MATERIAL

CROSS-REFERENCE TO RELATED APPLICATIONS

This application is the U.S. national phase of International Application No. PCT/JP2019/038154 filed Sep. 27, 2019 which designated the U.S. and claims priority to JP 2018-182980 filed Sep. 27, 2018, the entire contents of each of which are hereby incorporated by reference.

TECHNICAL FIELD

The present invention relates to an active material for use in a solid-state battery.

BACKGROUND ART

Lithium-ion secondary batteries have a large energy density, and downsizing and weight-saving thereof is easy. Thus, they are widely used as power sources of portable electronic devices such as laptop computers and mobile phones. Furthermore, lithium-ion secondary batteries with high output and high capacity are being developed nowadays that are mounted in electric vehicles, hybrid electric vehicles, and the like.

Currently, many lithium-ion secondary batteries use an electrolyte solution containing a flammable organic solvent. Thus, when the temperature of the battery increases due to a short circuit or the like, the electrolyte solution has a risk of ignition. Meanwhile, solid-state batteries, which include a solid electrolyte instead of an electrolyte solution and thus contain no flammable organic solvent, are unlikely to have a risk of ignition, and thus they are expected to be put in practical use as batteries having both high safety and high energy density.

Research has been conducted on sulfide solid electrolyte as a solid electrolyte for use in a solid-state battery. However, when a solid-state battery containing a sulfide solid electrolyte is charged and discharged, an interface resistance between an electrode active material and the sulfide solid electrolyte increases, and this results in restriction of transportation of lithium ions, which is problematic. It is probably because an electrode active material and a sulfide solid electrolyte react with each other to form a resistive layer at the interface therebetween. Regarding this problem, for example, an attempt has been made in Patent Literature 1 to suppress an increase in the interface resistance by coating the surface of a positive electrode active material with a specific compound.

CITATION LIST

Patent Literature

Patent Literature 1: US 2018/0219229A1

SUMMARY OF INVENTION

Problems to be Solved by Invention

Various techniques regarding active materials have been proposed so far. Meanwhile, a further improvement in the battery performance is currently in demand, and there is a need for an active material that can reduce an interface resistance with a sulfide solid electrolyte.

In view of the above-described problem, it is a main object of the present invention to provide an active material that can reduce an interface resistance with a sulfide solid electrolyte and improve the battery performance.

Means for Solving the Problems

The present invention provides an active material for use in a solid-state battery, exhibiting at least one peak in a range of from 0.145 nm to 0.185 nm and at least one peak in a range of from 0.28 nm to 0.31 nm in a radial distribution function obtained through measurement of an X-ray absorption fine structure of the active material.

Advantageous Effects of Invention

According to the present invention, an active material that can reduce an interface resistance with a sulfide solid electrolyte and improve the battery performance is provided.

DESCRIPTION OF EMBODIMENTS

Hereinafter, the present invention will be described by way of preferred embodiments thereof. The present invention relates to an active material for use in a solid-state battery.

A. Active Material

The active material of the present invention exhibits at least one peak in the range of 0.145 to 0.185 nm and at least one peak in the range of 0.28 to 0.31 nm in a radial distribution function obtained through measurement of an X-ray absorption fine structure (hereinafter, also referred to as an "XAFS") thereof.

Figure 1:
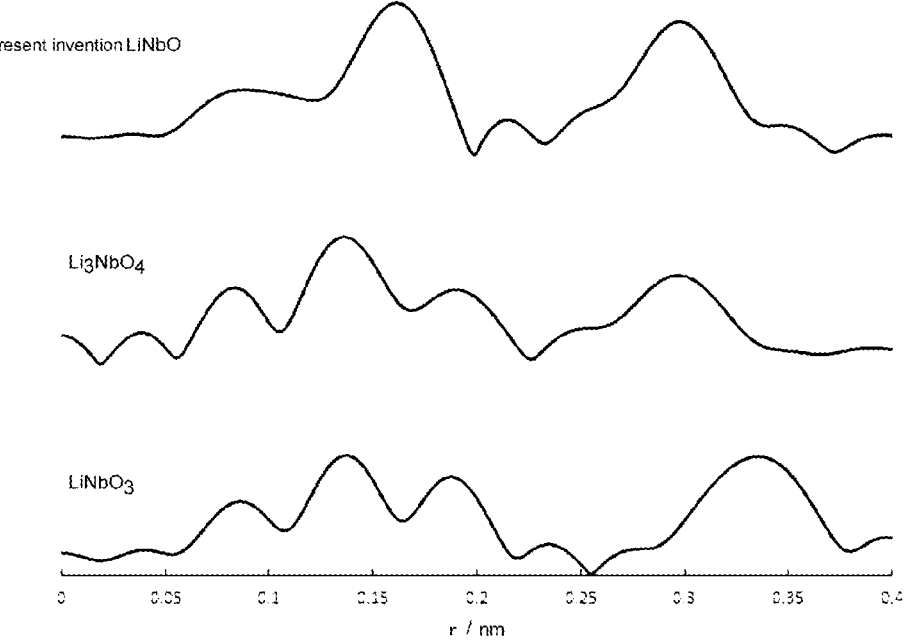
FIG. 1 shows radial distribution functions obtained through measurement of X-ray absorption fine structures of oxides containing lithium and niobium.

Specifically, as shown in FIG. 1, the active material of the present invention exhibits at least one peak in the range of from 0.145 nm to 0.185 nm in a radial distribution function obtained through measurement of a XAFS of the active material. The position of a peak is specified by the position of the top of the peak. The definition of the term "peak" will be described later.

The peak position in the present invention may be, for example, 0.148 nm or more, 0.151 nm or more, or 0.154 nm or more. The peak position may be, for example, 0.180 nm or less.

The number of peaks observed in the range is at least one, and, for example, the number of peaks may be only one, or may be two or more. In addition, the active material of the present invention exhibits at least one peak in the range of from 0.28 nm to 0.31 nm. The peak position in the present invention may be, for example, 0.285 nm or more. The peak position may be, for example, 0.310 nm or less, or 0.308 nm or less.

The active material of the present invention preferably has a core particle, and a coating layer located on the surface of the core particle.

The coating layer in the active material of the present invention includes oxide containing Li and Nb. Although various types of oxide containing Li and Nb are known, oxide having a specific chemical structure is used in the present invention. Hereinafter, this oxide is referred to as "LiNbO" for the sake of convenience. LiNbO used in the present invention is characterized by exhibiting peaks at specific interatomic distances, in a radial distribution function obtained through measurement of an X-ray absorption fine structure (hereinafter, also referred to as an "XAFS") of the active material. Specifically, in the radial distribution function shown in FIG. 1, the horizontal axis indicates an interatomic distance from the position of a niobium atom as a reference. The vertical axis indicates a probability of the existence of an atom positioned around niobium. A peak in the range of from 0.145 nm to 0.185 nm corresponds to a distance between a niobium atom and an oxygen atom, and a peak in the range of from 0.28 nm to 0.31 nm corresponds to a distance between niobium atoms. When LiNbO exhibiting peaks in the above-described predetermined ranges in a radial distribution function obtained from a XAFS is contained in the coating layer, the active material of the present invention can suppress an increase in an interface resistance with a sulfide solid electrolyte, and thus can improve the battery performance.

Figure 5:
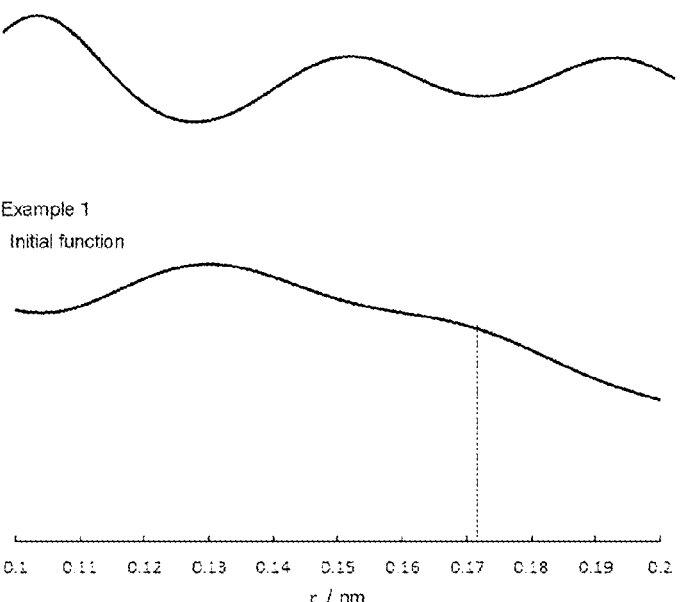
FIG. 5 is a graph for illustrating a process for determining whether or not there is a peak in a radial distribution function obtained through measurement of an X-ray absorption fine structure of the positive electrode active material of Example 1.

Exhibiting a peak in a radial distribution function means a state in which the radial distribution function may include an upward projecting portion or a shoulder portion. The state in which a second derivative obtained by differentiating twice a radial distribution function y=f(x), where the horizontal axis of the function is taken as x and the vertical axis thereof is taken as y, has a local minimum is defined as exhibiting a peak. In the present invention, it was determined whether or not there was a peak by differentiating a radial distribution function twice using Origin 9.1 (manufactured by Light Stone). For example, in Example 1 described later, a local minimum appears by differentiating twice the radial distribution function regarding a peak in the range of from 0.145 nm to 0.185 nm, as shown in FIG. 5, and accordingly, it can be said that, in Example 1, a peak is exhibited in the range of from 0.145 nm to 0.185 nm.

As described above, LiNbO preferably used in the present invention exhibits peaks each at a predetermined position at a specific interatomic distance, in a radial distribution function obtained from a XAFS thereof. On the contrary, conventionally known Li—Nb—O compounds do not exhibit a peak at the predetermined position prescribed in the present invention, in a radial distribution function obtained from a XAFS thereof. For example, LiNbO$_3$, which is a type of conventionally known Li—Nb—O compounds, does not exhibit any peak in the range of from 0.145 nm to 0.185 nm or the range of from 0.28 nm to 0.31 nm, as shown in FIG. 1. Furthermore, Li$_3$NbO$_4$, which is another type of conventionally known Li—Nb—O compounds, exhibits a peak in the range of from 0.28 nm to 0.31 nm, but does not exhibit any peak in the range of from 0.145 nm to 0.185 nm. Thus, the LiNbO favorably used in the present invention has a new structure that has not been known to date.

The XAFS technique involves analyzing an absorption spectrum obtained by irradiating a substance with X-rays. In an absorption spectrum obtained by irradiating a substance with X-rays, a sharp rise unique to an element contained in the substance, that is, an absorption edge is observed. A fine structure that appears in a range of approximately ±50 eV from the absorption edge is referred to as a XANES (X-ray Absorption NearEdge Structure). Also, a vibrational structure that appears in a range from the absorption edge to approximately 1000 eV on the higher energy side is referred to as an EXAFS (Extended X-ray Absorption Fine Structure). The region obtained by combining the XANES and the EXAFS is referred to as a XAFS. With the XAFS, a local structure (an interatomic distance and the number of coordinations) around an element of interest in a sample, and its chemical state (a valence and a coordination geometry) can be evaluated. Furthermore, the XAFS technique is a nondestructive measurement method and gives information on the outermost surface of a substance. Thus the active material of the present invention itself can be used as a measurement sample, and information on the coating layer of the active material can be obtained.

In the present invention, the process for measuring the XAFS of an active material is performed according to the following procedure.

Sample Preparation

A sample is crushed in an agate mortar and mixed with a boron nitride powder, and the mixture is shaped into a tablet with a diameter of 10 mm and a thickness of about 1 mm. The amounts of sample and boron nitride are set as appropriate to optimal amounts according to the Nb concentration in the sample to be measured and the absorption coefficients of the niobium compound and the compound of the core particle.

The conditions for measuring the XAFS at an Nb—K edge are as follows.

Laboratory: SPring-8

Experimental Station: BL14b2

Spectroscope: Monochromator Si (311)

Higher-order light removal: Rh coated mirror 2.4 mrad×2 pcs

Size of incident X-ray: vertical 1 mm×horizontal 5 mm (size of slit in front of sample)

Measurement method: transmission method

Detector: ionization chamber

Absorption edge measured: Nb—K absorption edge (18986 eV)

At each incident X-ray energy (E, x axis), I0 and It are measured, and an X-ray absorption (y axis) is determined by the following formula and plotted on the x-y axes, so that a XAFS spectrum is obtained.

$$\text{X-ray absorption } \mu t = -\ln(It/I0)$$

In order to acquire a radial distribution function based on the data obtained in this manner and determine an interatomic distance, the processing is performed according to the following procedure.

A radial distribution function obtained by Fourier-transforming an EXAFS spectrum will now be described.

"Athena" (Demeter ver.0.9.25) is used as analysis software.

First, a XAFS spectrum is read using the software, and a Pre-edge region (region from approximately −150 to −45 eV apart from the absorption edge) and a Post-edge region (region from approximately 150 to 1300 eV apart from the absorption edge), which are background absorption regions, are fitted, so that the XAFS spectrum is normalized. Next, in order to extract an EXAFS spectrum ($\chi$(k)), spline curve fitting is performed. The parameters used in the spline curve fitting in the analysis using the software are as follows.

Rbkg=1

Spline range in k: 1 to 15

Spline clamps low: None, high: None k-weight=3

Plotting k-weights: 3

Lastly, the EXAFS spectrum ($\chi$(k)) is Fourier-transformed to obtain a spectrum indicating the radial distribution function. The parameters in Fourier transform using the software are as follows.

k-range: 3.5 to 11.5 dk: 1

Window: Hanning

Arbitrary k-weight: 1

Phase correction: not performed

In view of further reducing the interface resistance between the active material and the sulfide solid electrolyte, it is advantageous that the moisture content of the active material of the present invention be adjusted within a certain range. Specifically, if the moisture content of the active material is excessively high, the interface resistance between the active material and the sulfide solid electrolyte may increase.

When the core particle in the active material contains a layered compound, a moisture content B (mass ppm) of the active material as measured up to 110° C. by the Karl-Fischer method may be, for example, 50 ppm or more, 150 ppm or more, or 200 ppm or more, and the moisture content B may be, for example, 8000 ppm or less, 5000 ppm or less, 3500 ppm or less, or 3000 ppm or less.

When the core particle in the active material contains a spinel-type compound, the moisture content B (mass ppm) of the active material as measured up to 110° C. by the Karl-Fischer method may be, for example, 1 ppm or more, 50 ppm or more, 100 ppm or more, or 200 ppm or more, and the moisture content B may be, for example, 8000 ppm or less, 5000 ppm or less, 3500 ppm or less, 2000 ppm or less, or 1000 ppm or less.

When the core particle in the active material contains a layered compound, a moisture content (mass ppm) of the active material as measured up to 250° C. by the Karl-Fischer method may be, for example, 350 ppm or more, 380 ppm or more, or 400 ppm or more, and the moisture content may be, for example, 10000 ppm or less, 6000 ppm or less, or 3000 ppm or less.

When the core particle in the active material contains a spinel-type compound, the moisture content (mass ppm) of the active material as measured up to 250° C. by the Karl-Fischer method may be, for example, 100 ppm or more, 150 ppm or more, 200 ppm or more, 250 ppm or more, 300 ppm or more, 350 ppm or more, 380 ppm or more, or 400 ppm or more, and the moisture content may be, for example, 10000 ppm or less, 6000 ppm or less, 3500 ppm or less, or 3000 ppm or less.

A BET specific surface area A (m²/g) of the active material of the present invention may be 0.2 m²/g or more, 0.3 m²/g or more, 0.4 m²/g or more, or 0.5 m²/g or more. The BET specific surface area A may be 5.0 m²/g or less, 3.0 m²/g or less, 2.5 m²/g or less, or 2.0 m²/g or less.

In the active material of the present invention, the ratio of the moisture content B (mass ppm) as measured up to 110° C. by the Karl-Fischer method to the BET specific surface area A (m²/g), B/A, may be, for example, 1 or more, 20 or more, 40 or more, 50 or more, 100 or more, or 200 or more, and the ratio B/A may be, for example, 8000 or less, 5000 or less, 3500 or less, 2000 or less, 1000 or less, or less than 1000.

In view of further reducing the interface resistance between the active material and the sulfide solid electrolyte, it is advantageous that the value of the ratio B/A be within an appropriate range according to the type of substances constituting the active material.

Specifically, when the core particle contains a layered compound such as lithium cobaltate (LiCoO₂) or lithium nickel cobalt manganese oxide (Li(Ni, Co, Mn)O₂), the value of the ratio B/A may be, for example, 50 or more, 100 or more, or 200 or more, and the value of the ratio B/A may be, for example, 8000 or less, 5000 or less, or 2000 or less.

Furthermore, when the core particles are contains a spinel-type compound such as lithium nickel manganese oxide (LiNi₀.₅Mn₁.₅O₄), the value of the ratio B/A may be, for example, 5 or more, 20 or more, 50 or more, 100 or more, 150 or more, or 200 or more, and the value of the ratio B/A may be 8000 or less, 5000 or less, or 2000 or less.

In the art, it has been heretofore considered that a lower moisture content of an active material is more preferable. The reason for this is that a sulfide solid electrolyte has been considered to deteriorate through reaction with water. However, the inventors of the present invention have conducted research and found that, even in the case in which the moisture content of the active material is excessively low, the interface resistance between the active material and the sulfide solid electrolyte is likely to increase. The inventors of the present invention considers the reason for this as follows: when a small amount of moisture is present on the active material, the active material comes into closer contact with the sulfide solid electrolyte, and thus a favorable interface is formed, which reduces the interface resistance. The water to be measured for the moisture content of the active material includes both adhering water and water of crystallization contained in the active material.

Regarding the moisture content of the active material, the intention in dividing the moisture content B as measured by the Karl-Fischer method by the BET specific surface area A is to normalize the moisture content of the active material. The moisture content is measured using the Karl-Fischer method according to the following procedure. Specifically, a sample to be measured is heated to 110 or 250° C., and the amount (ppm) of moisture emitted is measured using a Karl-Fischer titrator. The measurement is performed in an argon atmosphere, and, for example, 899 Coulometer (manufactured by Metrohm) and 860 KF Thermoprep (manufactured by Metrohm) are used as measuring apparatuses.

The BET specific surface area is obtained according to the single-point BET method, using a fully automatic specific surface area analyzer Macsorb (manufactured by Mountech Co., Ltd.) as a measuring apparatus. Specifically, a sample is weighed in a glass cell (standard cell), the glass cell is purged with nitrogen gas, and heat treatment is performed in the nitrogen gas atmosphere at 250° C. for 15 minutes. Subsequently, cooling is performed for 4 minutes in a flow of nitrogen-helium mixed gas. After cooling, measurement is performed on the sample (in the form of powder) using the single-point BET method. At the cooling and the measurement, mixed gas containing 30% of nitrogen and 70% of helium is used as adsorption gas.

The value of the ratio B/A of the active material can be adjusted, for example, by heat treatment or drying by heating under vacuum of the active material after producing the active material using later-described method.

The active material of the present invention preferably has a predetermined interface resistance. In particular, when the core particle in the active material contains a layered compound, the interface resistance of the active material is, for example, preferably $40\Omega$ or less, more preferably $30\Omega$ or less, even more preferably $25\Omega$ or less, and even more preferably $15\Omega$ or less. The interface resistance can be measured, for example, in the same manner as in the later-described examples, and thus a description thereof is now omitted.

The proportion of LiNbO contained in the active material, in terms of the ratio of the mass of niobium to the mass of active material for the sake of convenience, may be, for example, 0.01% by mass or more, 0.1% by mass or more, or 0.5% by mass or more, and the proportion of LiNbO may be, for example, 10% by mass or less, 5% by mass or less, or 3% by mass or less. The proportion can be determined by the ICP emission spectral analysis on a solution of the active material. The proportion can be controlled by adjusting the amount of niobium source compound used in the later-described method for producing the active material.

If there are carbonic acid ions on the surface of the active material, the amount of carbonic acid ions is preferably within a predetermined range, in view of effectively reducing the interface resistance between the active material and the sulfide solid electrolyte. The amount of carbonic acid ions on the surface of the active material is preferably less than 2.0% by mass, more preferably less than 1.5% by mass, even more preferably less than 1.0% by mass, even more preferably less than 0.5% by mass, even more preferably less than 0.35% by mass, even more preferably less than 0.30% by mass, and even more preferably less than 0.20% by mass, all based on the active material.

When the core particle contains a layered compound, the amount of carbonic acid ions on the surface of the active material is preferably less than 0.35% by mass, more preferably less than 0.30% by mass, and even more preferably less than 0.20% by mass, based on the active material.

When the core particle contains a spinel-type compound, the amount of carbonic acid ions on the surface of the active material is preferably less than 2.0% by mass, more preferably less than 1.5% by mass, even more preferably less than 1.0% by mass, even more preferably less than 0.5% by mass, and even more preferably less than 0.3% by mass, based on the active material.

For reducing the amount of carbonic acid ions on the surface of the active material, baking may be performed in a carbon dioxide-free atmosphere such as a nitrogen atmosphere or an oxygen atmosphere, for example.

The amount of carbonic acid ions may be measured, for example, by the following method. Specifically, 0.48 g of active material is added to 48 ml of pure water, and the mixture is stirred for 5 minutes and subjected to filtration. A liquid obtained by extracting carbonic acid ions in this manner is subjected to ion chromatography to determine the amount of $CO_3^{2-}$, and thus the amount of carbonic acid ions can be obtained.

The measurement can be performed at 35° C. using a DIONEX ICS-2000 as a measuring apparatus and a DIONEX IonPac AS17-C as a column (manufactured by Thermo Fisher Scientific K.K.), and using potassium hydroxide as a carrier fluid (eluting solvent).

The active material has a volume cumulative particle size $D_{50}$, which is the particle size at the cumulative volume 50% in the laser diffraction scattering particle size distribution analysis, of preferably 20 μm or less, more preferably less than 15 μm, even more preferably more than 1 μm and less than 10 μm, and even more preferably more than 2 μm and 8 μm or less. For example, when the active material with $D_{50}$ of 20 μm or less is used for a positive electrode material mixture, the active material can be securely brought into favorable contact with a sulfide solid electrolyte in the positive electrode material mixture to improve the utilization of lithium ions in the active material. When $D_{50}$ is more than 1 μm, increase in the slurry viscosity through coagulation of particles can be prevented. $D_{50}$ of the active material can be adjusted to the above-described range by adjusting the operation conditions of spray drying granulation or tumbling fluidized bed granulation, the conditions of pulverizing, or the like, but there is no limitation.

Hereinafter, regarding an active material having a core particle and a coating layer, which is a preferred embodiment of the active material of the present invention, the core particle and the coating layer constituting the active material will be described.

1. Core Particle

The core particle is not particularly limited as long as it functions as the active material. For example, the core particle may contain a lithium-metal complex oxide. As the lithium-metal complex oxide, a known lithium-metal complex oxide may be used. Examples of the metal in the lithium-metal complex oxide include a transition element and a typical element, and preferably a transition element is used. Examples of the lithium-metal complex oxide include lithium-transition metal oxides such as lithium cobaltate ($LiCoO_2$), lithium nickelate ($LiNiO_2$), lithium nickel cobalt manganese oxide ($Li(Ni, Co, Mn)O_2$), lithium manganate ($LiMn_2O_4$), and lithium nickel manganese oxide ($LiNi_{0.5}Mn_{1.5}O_4$). There is no particular limitation on the structure of these oxides, and it may be, for example, layered rock salt-type compound, or a spinel-type compound.

The core particle of the spinel-type compound is a particle containing Li, Mn, and O, and one or more of elements other than these elements. Furthermore, as an additional element, a combination of one or more of elements selected from the group consisting of Na, Mg, Al, P, K, Ca, Ti, V, Cr, Fe, Co, Ni, Cu, Ga, Y, Zr, Nb, Mo, In, Ta, W, Re, and Ce may be added. Of these elements, it is preferred to select from the group consisting of Na, Mg, Al, P, K, Ca, Ti, Fe, Co, Ni, Zr, Nb, Mo, and W.

Furthermore, it is possible to realize an action potential of 4.5 V or more mainly relative to the metal Li reference potential, by selecting the type and amount of additional elements as described below. Specifically, the core particle of the spinel-type compound may be a particle containing Li, Mn, and O, and one or more of elements other than these, at least one element of the "one or more of elements other than these elements" being an element M1 selected from the group consisting of Ni, Co, and Fe. The amount of the element M1 contained in the core particle is, for example, preferably 7% by mass or more, more preferably 9% by mass or more, and even more preferably 11% by mass or more, based on the total amount of all elements in the core particle. The amount of the element M1 contained in the core particle is, for example, preferably 35% by mass or less, more preferably 30% by mass or less, and even more preferably 25% by mass, based on the total amount of all elements in the core particle. When one or more of these elements are contained, an action potential of 4.5 V or more mainly relative to the metal Li reference potential is realized. An element M2 different from the element M1 may also be contained, and the element M2 may be a combination of one or more of elements selected from the group consisting of Na, Mg, Al, P, K, Ca, Ti, V, Cr, Fe, Co, Ni, Cu, Ga, Y, Zr, Nb, Mo, In, Ta, W, Re, and Ce. Of these, the element M2 is preferably selected from the group consisting of Na, Mg, Al, P, K, Ca, Ti, Fe, Co, Ni, Zr, Nb, Mo, and W.

When the core particle contains a lithium-metal complex oxide, the content of lithium-metal complex oxide in the core particle may be, for example, 80% by mass or more, 90% by mass or more, or 95% by mass or more. The core particle may be made only of a lithium-metal complex oxide. The lithium-metal complex oxides may be used singly or in combination of two or more.

2. Coating Layer

The coating layer located on the surface of the core particle may cover the entire surface of the core particle, or partially cover the surface of the core particle such that part of the surface of the core particle is exposed. In other words, the coating layer preferably covers the surface of the core particles to an extent such that the effects of the present invention are exhibited. Specifically, the coverage of the coating layer may be, for example, 50% or more, 70% or more, 90% or more, or 100%.

The coating layer may be made of any material that can coat the core particle and exhibits the peaks at predetermined positions in a radial distribution function obtained through the above-described XAFS measurement on the active material of the present invention. Examples of such a material include an oxide containing the lithium (Li) element and the niobium (Nb) element. The oxide containing the Li element and the Nb element may contain, for example, only the Li element and the Nb element as metal elements, or may further contain another metal element. Examples of the other metal element include the titanium (Ti) element and the zirconium (Zr) element. The types of elements contained in the oxide forming the coating layer can be determined by element mapping on the positive electrode active material, observation of the surface of the core particle by X-ray photoelectron spectroscopy (XPS) and scanning transmission electron microscopy (STEM), and, when necessary, energy dispersive X-ray spectroscopy (EDS) in combination, or Auger electron spectroscopy. The types of elements can also be identified by ICP emission spectral analysis method on a solution of the positive electrode active material. If the oxide forming the coating layer contains another metal element different from the Li element and the Nb element, the molar ratio between the other metal element and the Nb element, the other metal element different from the Li element and the Nb element/ the Nb element, is, for example, preferably 0.5 or less, more preferably 0.3 or less, even more preferably 0.2 or less, and even more preferably 0.1 or less.

3. Method for Producing Active Material (1) Formation of Core Particle

The core particle used in the present invention can be obtained, for example, by the following method: raw materials such as a lithium salt compound, a manganese salt compound, a nickel salt compound, and a cobalt salt compound are weighed and mixed; the mixture is milled using a wet mill or the like, granulated, baked, and heated when necessary; and the resultant is pulverized under preferable conditions, and sieved when necessary. Alternatively, the core particle can also be obtained using a method including adding a basic substance such as sodium hydroxide to an aqueous solution containing manganese salt compound, a nickel salt compound, and a cobalt salt compound to precipitate a metal complex hydroxide, mixing the metal complex hydroxide and a lithium salt compound, and baking the mixture.

Examples of the lithium salt compound used as a raw material include lithium hydroxide (LiOH), lithium carbonate ($Li_2CO_3$), lithium nitrate ($LiNO_3$), LiOH—$H_2O$, lithium oxide ($Li_2O$), fatty acid lithium, and lithium halide. Of these substances, lithium hydroxide, lithium carbonate, and lithium nitrate are preferable.

Examples of the manganese salt compound include manganese carbonate, manganese nitrate, manganese chloride, and manganese dioxide. Of these substances, manganese carbonate and manganese dioxide are preferable, and electrolytic manganese dioxide, which is obtained by the electrolytic method, is particularly preferable.

Examples of the nickel salt compound include nickel carbonate, nickel nitrate, nickel chloride, nickel oxyhydroxide, nickel hydroxide, and nickel oxide, and, of these substances, nickel carbonate, nickel hydroxide, and nickel oxide are preferable.

Examples of the cobalt salt compound include basic cobalt carbonate, cobalt nitrate, cobalt chloride, cobalt oxyhydroxide, cobalt hydroxide, and cobalt oxide, and, of these substances, basic cobalt carbonate, cobalt hydroxide, cobalt oxide, and cobalt oxyhydroxide are preferable.

In mixing of the above-described raw materials, a liquid medium including water and a dispersant is preferably added for wet mixing, thereby forming the mixture into a slurry. If the later-described spray drying is performed, the obtained slurry is preferably milled using a wet mill, but may be subjected to dry milling.

The above-described granulation may be either wet granulation or dry granulation as long as the raw materials milled in the preceding step are dispersed in the resulting granules without separation. Examples of the granulation method include extruding granulation, tumbling granulation, fluidized bed granulation, mix granulation, spray drying granulation, compression molding granulation, and flake granulation using a roll or the like.

When performing wet granulation, it is necessary to sufficiently dry the resulting product before baking. The drying method may be any of known drying methods including heat spray drying, hot air drying, vacuum drying, and freeze drying, and, of these methods, heat spray drying is preferable. The heat spray drying is preferably performed using a spray drier.

The baking is preferably performed by keeping a temperature, for example, higher than 700° C. and lower than 1000° C., preferably 750 to 1000° C., and more preferably 800 to 950° C. for 0.5 to 30 hours in an air atmosphere, an oxygen gas atmosphere, an atmosphere in which the oxygen partial pressure has been adjusted, a carbon dioxide gas atmosphere, or other atmospheres, in a kiln. At this time, it is preferable to select baking conditions such that the transition metal is dissolved at the atomic level to form a monophase. The type of the kiln to be used for baking is not limited, and examples thereof include a rotary kiln and a static kiln.

The heat treatment after the baking is preferably performed when it is necessary to modify the crystal structure, and, for example, the heat treatment may be performed under conditions in an oxidizing atmosphere such as an air atmosphere, an oxygen gas atmosphere, or an atmosphere in which the oxygen partial pressure has been adjusted.

(2) Formation of Coating Layer

The coating layer may be formed on the surface of the core particle thus obtained by bringing the core particle into contact with a treatment liquid containing the lithium source compound and the niobium source compound. Examples of the lithium source compound include lithium hydroxide, lithium sulfate, and lithium chloride. Examples of the niobium source compound include ammonium peroxoniobate. The lithium raw material and ammonium peroxoniobate react with each other in the solution to produce LiNbO when a slurry is heated at 90° C. or higher, the slurry being prepared by mixing the core particle and a treatment liquid obtained by dissolving these compounds in water. Since LiNbO tends to be adsorbed to the surface of the positive electrode active material, a coating layer containing LiNbO can be formed on the surface of the core particle by drying the slurry. A treatment liquid obtained by heating lithium raw material and ammonium peroxoniobate to 90° C. or higher may be sprayed onto the core particle, or LiNbO purified from the treatment liquid heated to 90° C. or higher may be used for coating. Subsequently, pulverizing and heat treatment are performed when necessary.

The amount of treatment liquid used is, for example, such that the content of niobium in the active material is preferably 0.01% by mass or more, more preferably 0.1% by mass or more, and even more preferably 0.5% by mass or more, and is preferably 10% by mass or less, more preferably 5% by mass or less, and even more preferably 3% by mass or less. There is no particular limitation on the concentration of the treatment liquid.

A coating layer containing LiNbO with a specific structure can be obtained by drying the slurry. In order to dry the slurry, spray drying granulation or tumbling fluidized bed granulation may be used, for example. Subsequently, heat treatment may be performed when necessary, and, specifically, heat treatment is preferably performed in an oxygen, nitrogen, or argon atmosphere that contains carbon dioxide gas as little as possible. The drying temperature and heating temperature may be preferably 105° C. or higher 400° C. or less, more preferably 150° C. or higher 400° C. or less, and even more preferably 200° C. or higher 380° C. or less. The temperatures are more preferably from 205 to 350° C. The heating time is preferably from 1 to 20 hours, more preferably from 1 to 15 hours, and even more preferably from 1 to 10 hours. These conditions enables successful production of LiNbO that exhibits peaks at positions of specific interatomic distances, in a radial distribution function obtained from a XAFS thereof. The inventors of the present invention have found that, if the heat treatment is performed at an excessively high temperature, $Li_3NbO_4$ (this compound does not exhibit peaks at positions at specific interatomic distances, in a radial distribution function obtained from a XAFS thereof) is produced.

The active material obtained in this manner may be subjected, for example, to heat treatment again or drying by heating under vacuum, in order to further reduce the moisture content.

4. Applicability of Active Material

The active material of the present invention can be typically used as a positive electrode active material. The active material of the present invention is used in a solid-state battery. In particular, the active material of the present invention is advantageously used in a solid-state battery containing a sulfide solid electrolyte as a solid electrolyte. Contact between the active material of the present invention and a sulfide solid electrolyte in the solid-state battery brings about the effects of the present invention. "Contact between the active material and sulfide solid electrolyte" means any one of the following states: (a) the positive electrode material mixture contains a sulfide solid electrolyte (in this case, the solid electrolyte layer may be non-sulfide); (b) the positive electrode material mixture is free of a sulfide solid electrolyte while the solid electrolyte layer contains a sulfide solid electrolyte; and (c) the positive electrode material mixture and the solid electrolyte layer each contain a sulfide solid electrolyte.

B. Positive Electrode Material Mixture

The positive electrode material mixture of the present invention contains an active material and a sulfide solid electrolyte. The active material contained in the positive electrode material mixture may be as described in "A. Active Material" hereinabove, and thus a description thereof will now be omitted.

The sulfide solid electrolyte used in the present invention may be any sulfide solid electrolyte used in ordinary solid-state batteries. The sulfide solid electrolyte in the present invention may contain, for example, Li and S, and have lithium ion conductivity. The sulfide solid electrolyte may be any of crystalline material, glass ceramic, and glass. The sulfide solid electrolyte may have a crystal phase of an argyrodite structure. Examples of such a sulfide solid electrolyte include $Li_2S$—$P_2S_5$, $Li_2S$—$P_2S_5$-LiHa ("Ha" represents one or more of halogen elements), and $Li_2S$—$P_2S_5$—$P_2O_5$, $Li_2S$—$Li_3PO_4$—$P_2S_5$, $Li_3PS_4$, $Li_4P_2S_6$, $Li_{10}GeP_2S_{12}$, $Li_{3.25}Ge_{0.25}P_{0.75}S_4$, $Li_7P_3S_{11}$, $Li_{3.25}P_{0.95}S_4$, $Li_{7-x}PS_{6-x}Ha_x$ (argyrodite solid electrolyte, "Ha" represents one or more of halogen elements, and $0.2 < x < 2.0$ or $0.2 < x < 1.8$).

As the active material contained in the positive electrode material mixture of the present invention, the active material of the present invention may be used alone, or may be used in combination with another active material. Examples of the other active material include particles made of the above-described known lithium-transition metal complex oxides, and the particles may or may not have a coating layer. When used in combination, the active material of the present invention is contained in an amount of preferably 50 mol % or more, and more preferably 70% or more of based on the entire active material.

The content of the sulfide solid electrolyte in the positive electrode material mixture of the present invention is typically from 10 to 50% by mass. Furthermore, the positive electrode material mixture may also contain other materials such as a conductivity aid or a binder when necessary. The positive electrode layer can be formed by mixing the positive electrode material mixture and a solvent to form paste, applying the paste to a current collector such as aluminum foil, and drying the resulting coating.

C. Solid-State Battery

The solid-state battery of the present invention includes a positive electrode layer, a negative electrode layer, and a solid electrolyte layer, the positive electrode layer containing the above-described positive electrode material mixture.

The solid-state battery of the present invention can be produced, for example, by stacking three layers, i.e., the positive electrode layer produced as described above, a solid electrolyte layer, and a negative electrode layer, and subjecting the resulting stack to compression-molding.

The negative electrode active material used in a negative electrode layer may be any negative electrode active material used in ordinary solid-state batteries. Specific examples of the negative electrode active material include known materials such as materials that intercalate and deintercalate lithium ions, for example, carbon materials, silicone and silicon oxide compounds such as Si—O, tin compounds, and lithium titanate. Examples of the carbon material include those obtained by sintering organic high molecular compounds such as polyacrylonitrile, phenol resin, phenol novolac resin, and cellulose, artificial graphite, and natural graphite. The negative electrode layer can be produced in the same manner as for the positive electrode layer, except that such a negative electrode active material is used.

EXAMPLES

Hereinafter, the present invention will be more specifically described by way of examples. However, the present invention is not limited to the following examples.

Example 1

(1A) Production of Core Particle

Sodium hydroxide was fed to an aqueous solution in which nickel sulfate, cobalt sulfate, and manganese sulfate were dissolved, to thereby obtain metal complex hydroxide by the coprecipitation method. The molar ratio between nickel, cobalt, and manganese in the metal complex hydroxide was Ni:Co:Mn=0.6:0.2:0.2. The metal complex hydroxide was mixed with lithium carbonate, and in a static electric kiln, the mixture was pre-baked in air at 720° C. for 5 hours, and then baked in air at 905° C. for 22 hours, to thereby obtain a lithium-metal complex oxide. This lithium-metal complex oxide was pulverized in a mortar, and sieved with a sieve with an opening of 53 μm, and thus the core particle, which was a lithium-metal complex oxide powder as the undersize product, was collected. The core particle was made of a layered rock salt-type compound, and the molar ratio between nickel, cobalt, and manganese was Ni:Co:Mn=0.6:0.2:0.2, as in the metal complex hydroxide described above.

(2A) Production of Active Material (Positive Electrode Active Material)

3.68 g of LiOH—H$_2$O and 24 g of ammonium peroxoniobate were dissolved in 2000 ml of water to obtain a treatment liquid. Hereinafter, this treatment liquid will be referred to as the treatment liquid A. The treatment liquid A was added to 200 g of the core particle obtained in the step (1), and the mixture was heated at 90° C. or higher. Through heating at 90° C. or higher, the lithium raw material and ammonium peroxoniobate react with each other in the solution. Accordingly, LiNbO, which tends to be adsorbed to the surface of the core particle, was produced on the surface of the core particle. Subsequently, the obtained material was dried at 310° C. by spray drying granulation, to thereby obtain a positive electrode active material. D$_{50}$ of the obtained positive electrode active material was 2.9 μm. This sample exhibited one peak in the range of 0.145 to 0.185 nm, and also one peak in the range of 0.28 to 0.31 nm.

Example 2

In this example, a positive electrode active material was obtained in the same manner as in Example 1, except that the particle size of the core particle in the step (1A) was changed, and that the amount of LiOH—H$_2$O and that of ammonium peroxoniobate added to produce the treatment liquid A in the step (2A) were changed to 1.7 g and 11.1 g, respectively. This sample exhibited one peak in the range of from 0.145 nm to 0.185 nm, and also one peak in the range of from 0.28 nm to 0.31 nm.

Example 3

A positive electrode active material was obtained in the same manner as in Example 1, except that the conditions shown in Table 1 were used. This sample exhibited one peak in the range of from 0.145 nm to 0.185 nm, and also one peak in the range of from 0.28 nm to 0.31 nm.

Example 4

In this example, a positive electrode active material was obtained in the same manner as in Example 1, except for the following: the composition of the core particle in the step (1A) was Ni:Co:Mn=0.33:0.33:0.33; in the step (2A), 500 g of the core particle, 6.8 g of LiOH—H$_2$O, and 44.4 g of ammonium peroxoniobate were added to 2500 ml of water to produce a slurry, the drying temperature was set to 110° C., and heat treatment after drying was performed at 350° C. for 5 hours. This sample exhibited one peak in the range of from 0.145 nm to 0.185 nm, and also one peak in the range of from 0.28 nm to 0.31 nm.

Example 5

A positive electrode active material was obtained in the same manner as in Example 1, except that vacuum drying at 120° C. for 2 hours was added at the end of the step (2A). This sample exhibited one peak in the range of from 0.145 nm to 0.185 nm, and also one peak in the range of from 0.28 nm to 0.31 nm.

Example 6

A positive electrode active material was obtained in the same manner as in Example 3, except that vacuum drying at 120° C. for 2 hours was added at the end of the step (2A). This sample exhibited one peak in the range of from 0.145 nm to 0.185 nm, and also one peak in the range of from 0.28 nm to 0.31 nm.

Example 7

A positive electrode active material was obtained in the same manner as in Example 4, except that LiOH—H$_2$O was not added in the step (2A) and that heat treatment was not performed in the step (2A). This sample exhibited one peak in the range of from 0.145 nm to 0.185 nm, and also one peak in the range of from 0.28 nm to 0.31 nm.

Example 8

A positive electrode active material was obtained in the same manner as in Example 4, except that heat treatment was not performed in the step (2A). This sample exhibited one peak in the range of from 0.145 nm to 0.185 nm, and also one peak in the range of from 0.28 nm to 0.31 nm.

Example 9

A positive electrode active material was obtained in the same manner as in Example 4, except that the amount of LiOH—H$_2$O and the amount of water were changed to 20.3 g and 1000 ml, respectively, in the step (2A) and that heat treatment was not performed in the step (2A). This sample exhibited one peak in the range of from 0.145 nm to 0.185 nm, and also one peak in the range of from 0.28 nm to 0.31 nm.

Example 10

(1B) Production of Core Particle

Each of lithium carbonate, electrolytic manganese diox-ide, nickel hydroxide, and titanium oxide was weighed. These materials were added to ion-exchanged water and milled in a wet mill to obtain a milled slurry. The obtained milled slurry was subjected to heat spray drying, to obtain a granulated powder. The obtained granulated powder was baked in an air atmosphere at 900° C. for 37 hours using a static electric kiln. The baked material was pulverized and heated at 750° C. for 37 hours. Subsequently, the material was washed with water, followed by filtration, and the filter cake was dried at 500° C. for 7 hours. After pulverizing, the pulverized material was put in a tubular static kiln, and heated at 725° C. for 5 hours while allowing oxygen to flow into the static kiln at a flow rate of 0.5 L/min. The heated material was sieved with a sieve with an opening of 53 μm, and thus core particle made of lithium manganese-contain-ing complex oxide as the undersize product were collected. The core particle was identified as spinel-type lithium man-ganese-containing complex oxide, through XRD measure-ment. As a result of chemical analysis, this lithium manga-nese-containing complex oxide contained 4.2% by mass of Li, 13.0% by mass of Ni, 42.5% by mass of Mn, and 5.3% by mass of Ti.

(2B) Production of Active Material (Positive Electrode Active Material)

13.47 g of LiOH—$H_2O$ and 29.30 g of ammonium peroxoniobate were dissolved in 586 ml of water to obtain an aqueous solution. This aqueous solution was heated at 90° C. or higher for 2 hours, and then cooled, and thus LiNbO was purified. Then, 2 g of the core particle obtained in the step (1) was added to 18 ml of aqueous lithium hydroxide solution having a Li concentration of 11.4 g/L, and the mixture was heated at 90° C. or higher for 10 minutes. The reason for this is that, through heating at 90° C. or higher, lithium raw material and ammonium peroxo-niobate react with each other in the solution to thereby produce LiNbO according to the present invention, which tends to be adsorbed to the surface of the positive electrode active material. Then, 0.346 g of the purified LiNbO was dissolved in 9.9 ml of water, and the resulting solution was added to the mixed solution, followed by further mixing. The resulting mixed solution was decanted, and the solid was dried at 120° C. and heated at 350° C. for 2 hours to obtain a positive electrode active material. This sample exhibited one peak in the range of from 0.145 nm to 0.185 nm, and also one peak in the range of from 0.28 nm to 0.31 nm.

Comparative Example 1

In the step (1A) of this comparative example, the com-position of the core particle was set to Ni:Co:Mn=0.33:0.33: 0.33. In the step (1B) of this comparative example, 20 g of the core particle was added to a treatment liquid obtained by dissolving 0.17 g of LiOH—$H_2O$ and 1.13 g of ammonium peroxoniobate in 33 ml of water, the resulting mixture was subjected to evaporation in a hot air drying furnace at 120° C. to dry, and the resulting material was heated in an air atmosphere at 500° C. for 5 hours. Thus a positive electrode active material was obtained in this comparative example. This sample did not exhibit any peak in the range of from 0.145 nm to 0.185 nm, but exhibit one peak in the range of from 0.28 nm to 0.31 nm.

Comparative Example 2

In this comparative example, the core particle obtained in the step (1B) itself was used as a positive electrode active material.

Evaluation

Figure 2:
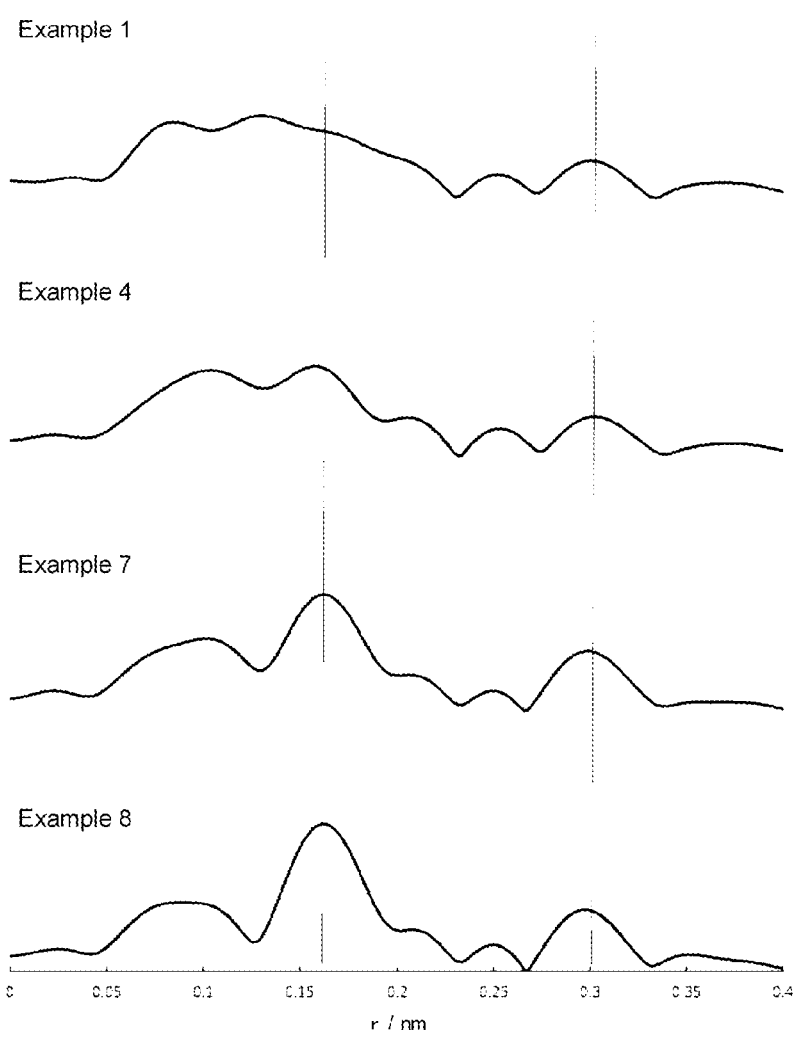
FIG. 2 shows radial distribution functions obtained through measurement of X-ray absorption fine structures of positive electrode active materials obtained in Examples.
Figure 3:
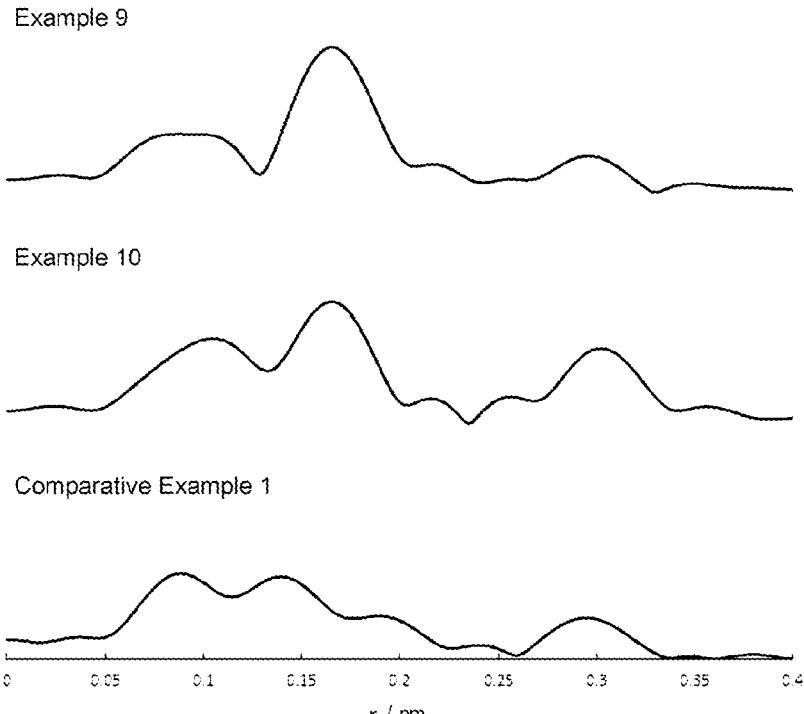
FIG. 3 shows radial distribution functions obtained through measurement of X-ray absorption fine structures of positive electrode active materials obtained in Examples and Comparative Examples.

Each of the positive electrode active materials obtained in Examples 1, 4, and 7 to 10, and Comparative Example 1 was subjected to XAFS measurement using the above-described method to obtain a radial distribution function. FIGS. 2 and 3 show the results. Furthermore, for each of the positive electrode active materials obtained in Examples and Com-parative Examples, the value of B/A, the particle size $D_{50}$, the BET specific surface area, and the moisture content (110° C. and 250° C.) were determined using the above-described methods, and the interface resistance with a solid electrolyte or the discharge capacity was measured using the method described below. Tables 1 and 2 show the results.

Measurement of Interface Resistance

Figure 4:
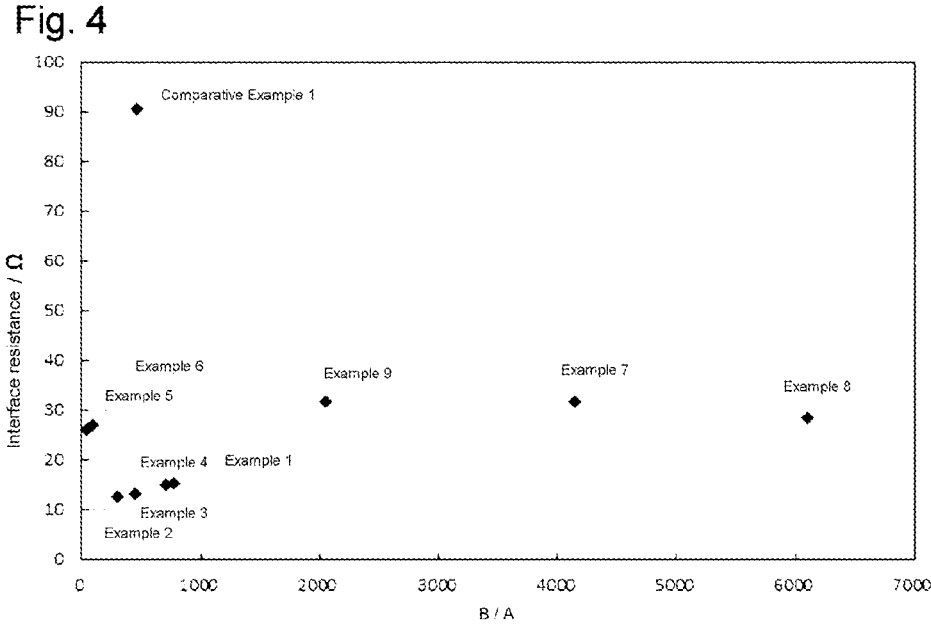
FIG. 4 is a graph showing interface resistances of batteries obtained using the positive electrode active materials obtained in Examples and Comparative Examples.

A positive electrode layer was produced according to a common method using each of the layered positive electrode active materials in Examples 1 to 9 and Comparative Example 1. Specifically, the obtained positive electrode active material, $Li_{5.8}PS_{4.8}Cl_{1.2}$ as a sulfide solid electrolyte (argyrodite solid electrolyte), and VGCF (registered trade-mark) as a conductivity aid were mixed in a mass ratio of 80:17:3 to produce a positive electrode material mixture, which was made into a positive electrode layer. Further-more, a negative electrode layer was produced according to a common method using graphite as a negative electrode active material. Next, the positive electrode layer, the sulfide solid electrolyte layer ($Li_{5.8}PS_{4.8}Cl_{1.2}$ as an argyrodite solid electrolyte), and the negative electrode layer were stacked in this order, and the resulting stack was subjected to compres-sion-molding to produce a solid-state battery. After the third cycle of charge and discharge in the initial stage, the solid-state battery was charged to 50% of the discharge capacity, and the AC impedance was measured. The inter-face resistance (Ω) was calculated from the intersection, with the horizontal axis, of a Cole-Cole plot that is a complex impedance plane plot of the measurement results. FIG. 4 shows the results.

A value obtained by subtracting the interface resistance in each example from the interface resistance in Comparative Example 1 was divided by the interface resistance in Com-parative Example 1 and multiplied by 100. The resulting value is listed as the improvement in the interface resistance in Tables 1 and 2. A larger improvement in the interface resistance means a smaller interface resistance.

The device specifications and conditions used in the measurement were as follows.

Measuring apparatus: Solartron 1255B frequency response analyzer manufactured by Toyo Technica Inc.

AC amplitude: 10 mV

Frequency region: $1.0 \times 10^6$ to $1.0 \times 10^1$ Hz

Measurement of Discharge Capacity

It has been found that in cases of spinel-type compounds as in Example 10 and Comparative Example 2, an interface resistance between the active material and the sulfide solid electrolyte is very large, and that it is difficult for a sample with such a high interface resistance to secure discharge capacity. Thus, in the cases of spinel-type compounds, the discharge capacity was taken as an alternative measure of the interface resistance for evaluation. An increase in the discharge capacity suggests a decrease in the interface resistance.

A positive electrode layer was produced according to a common method using the spinel-type positive electrode active material in Example 10 or Comparative Example 2. Specifically, the obtained positive electrode active material, $Li_{5.4}PS_{4.4}Cl_{0.8}Br_{0.8}$ as a sulfide solid electrolyte (argyrodite solid electrolyte), and VGCF (registered trademark) as a conductivity aid were mixed in a mass ratio of 60:30:10 to produce a positive electrode material mixture, which was made into a positive electrode layer. Furthermore, a negative electrode layer was produced according to a common method using graphite as a negative electrode material. Next, the positive electrode layer, the solid electrolyte layer ($Li_{5.4}PS_{4.4}Cl_{0.8}Br_{0.8}$ as an argyrodite solid electrolyte), and the negative electrode layer were stacked in this order, and the resulting stack was subjected to compression-molding to produce a solid-state battery. This solid-state battery was charged at a current value of 0.1 C to 5.0 V, further charged at a constant voltage to a current value of 0.025 C, and then discharged at 0.1 C to 3.0 V. The capacity at that time is listed as an initial discharge capacity in Table 2.

TABLE 1

| | Core particle | Ex. 1 $Li[Ni_{0.6}Co_{0.2}Mn_{0.2}]O_2$ | Ex. 2 $Li[Ni_{0.6}Co_{0.2}Mn_{0.2}]O_2$ | Ex. 3 $Li[Ni_{0.6}Co_{0.2}Mn_{0.2}]O_2$ |
|---|---|---|---|---|
| Formation of coating layer | Temperature for drying (° C.) | 310 | 310 | 320 |
| | Temperature for heat treatment (° C.) | None | None | None |
| | Time for heat treatment (h) | None | None | None |
| Active material | Proportion of Nb in positive electrode active material (wt %) | 1.7 | 1.3 | 1.8 |
| | $D_{50}$ (μm) | 2.9 | 7.7 | 2.9 |
| | Specific surface area A ($m^2g^{-1}$) | 2.5 | 1.3 | 1.8 |
| | 110° C. moisture content B (ppm) | 1944 | 400 | 821 |
| | 250° C. moisture content (ppm) | 2683 | 813 | 1247 |
| | Residual carbonate ions (mass %) | 0.14 | 0.11 | 0.11 |
| | B/A | 778 | 308 | 456 |
| Evaluation | Interface resistance (Ω) | 15.2 | 12.7 | 13.2 |
| | Improvement in interface resistance (%) | 83 | 86 | 85 |
| | Discharge capacity (mAh/g) | — | — | — |

| | Core particle | Ex. 4 $Li[Ni_{0.33}Co_{0.33}Mn_{0.33}]O_2$ | Ex. 5 $Li[Ni_{0.6}Co_{0.2}Mn_{0.2}]O_2$ | Ex. 5 $Li[Ni_{0.6}Co_{0.2}Mn_{0.2}]O_2$ |
|---|---|---|---|---|
| Formation of coating layer | Temperature for drying (° C.) | 110 | 310 | 320 |
| | Temperature for heat treatment (° C.) | 350 | None | None |
| | Time for heat treatment (h) | 5 | None | None |

TABLE 1-continued

| | | | | |
|---|---|---|---|---|
| Active material | Proportion of Nb in positive electrode active material (wt %) | 1.9 | 1.7 | 1.8 |
| | $D_{50}$ (μm) | 4.7 | 2.9 | 2.9 |
| | Specific surface area A (m²g⁻¹) | 1.2 | 2.1 | 1.6 |
| | 110° C. moisture content B (ppm) | 846 | 85 | 146 |
| | 250° C. moisture content (ppm) | 1618 | 749 | 559 |
| | Residual carbonate ions (mass %) | 0.22 | 0.1 | 0.08 |
| | B/A | 705 | 40 | 91 |
| Evaluation | Interface resistance (Ω) | 15.0 | 26.0 | 27.0 |
| | Improvement in interface resistance (%) | 83 | 71 | 70 |
| | Discharge capacity (mAh/g) | — | — | — |

TABLE 2

| | | Ex. 7 | Ex. 8 | Ex. 9 |
|---|---|---|---|---|
| | Core particle | $Li[Ni_{0.33}Co_{0.33}Mn_{0.33}]O_2$ | $Li[Ni_{0.33}Co_{0.33}Mn_{0.33}]O_2$ | $Li[Ni_{0.33}Co_{0.33}Mn_{0.33}]O_2$ |
| Formation of coating layer | Temperature for drying (° C.) | 110 | 110 | 110 |
| | Temperature for heat treatment (° C.) | None | None | None |
| | Time for heat treatment (h) | None | None | None |
| Active material | Proportion of Nb in positive electrode active material (wt %) | 1.9 | 1.9 | 2.0 |
| | $D_{50}$ (μm) | 3.5 | 2.5 | 2.5 |
| | Specific surface area A (m²g⁻¹) | 1.5 | 1.1 | 3.3 |
| | 110° C. moisture content B (ppm) | 6015 | 6934 | 6684 |
| | 250° C. moisture content (ppm) | 9108 | 8777 | 9143 |
| | Residual carbonate ions (mass %) | 0.08 | 0.09 | 0.27 |
| | B/A | 4145 | 6105 | 2054 |
| Evaluation | Interface resistance (Ω) | 31.8 | 28.4 | 31.8 |
| | Improvement in interface | 65 | 69 | 65 |

TABLE 2-continued

| | | Ex. 10 $Li[Ni_{0.4}Mn_{1.4}Ti_{0.2}]O_4$ | Com. Ex. 1 $Li[Ni_{0.33}Co_{0.33}Mn_{0.33}]O_2$ | Com. Ex. 2 $Li[Ni_{0.4}Mn_{1.4}Ti_{0.2}]O_4$ |
|---|---|---|---|---|
| | resistance (%) Discharge capacity (mAh/g) | — | — | — |
| Core particle | | | | |
| Formation of coating layer | Temperature for drying (° C.) | 120 | 120 | — |
| | Temperature for heat treatment (° C.) | 350 | 500 | — |
| | Time for heat treatment (h) | 2 | 5 | — |
| Active material | Proportion of Nb in positive electrode active material (wt %) | 6.0 | 1.7 | — |
| | $D_{50}$ (μm) | 4.2 | 2.2 | 4.8 |
| | Specific surface area A ($m^2g^{-1}$) | 2.4 | 2.1 | 1.2 |
| | 110° C. moisture content B (ppm) | 536 | 966 | 183 |
| | 250° C. moisture content (ppm) | 1491 | 1330 | 258 |
| | Residual carbonate ions (mass %) | 1.09 | 0.21 | <0.01 |
| | B/A | 223 | 459 | 153 |
| Evaluation | Interface resistance (Ω) | — | 90.6 | — |
| | Improvement in interface resistance (%) | — | 0 | — |
| | Discharge capacity (mAh/g) | 81 | — | 17 |

It is seen from the results of the XAFS measurement shown in FIGS. 2 and 3 that the positive electrode active materials in Examples each exhibit one peak in the range of from 0.145 nm to 0.185 nm and one peak in the range of from 0.28 nm to 0.31 nm. On the other hand, the positive electrode active material in Comparative Example 1 exhibits a peak in the range of from 0.28 nm to 0.31 nm, but does not exhibit any peak in the range of from 0.145 nm to 0.185 nm.

Furthermore, as is clear from the results shown in Tables 1 and 2, the solid-state batteries each including the positive electrode active materials obtained in Examples have a reduced interface resistance. On the other hand, the solid-state battery including the positive electrode active material obtained in Comparative Example 1 has a higher interface resistance than that of Examples. Furthermore, the solid-state battery including the positive electrode active material obtained in Comparative Example 2 has a lower discharge capacity than that of Example 10, and in other words, has a higher interface resistance. Accordingly, it is seen that the battery performance is improved by using the active material of the present invention.

Example 11

31 g of LiOH—H$_2$O and 6.4 g of ammonium peroxonio-bate were dissolved in 450 ml of water to produce a treatment liquid. This treatment liquid is referred to as the treatment liquid A.

32 g of lithium sulfate was dissolved in 2000 ml of water to produce another treatment liquid. This treatment liquid is referred to as the treatment liquid B.

A spinel-type compound $Li[Ni_{0.4}Mn_{1.4}Ti_{0.2}]O_4$ was used as the core particle.

100 g of the core particle was added to the treatment liquid A, and the mixture was heated at 90° C. or higher and then subjected to solid-liquid separation to obtain a residue C. The residue C and 900 ml of treatment liquid B were mixed, and the mixture was subjected to solid-liquid separation to obtain a residue D. The residue D and 900 ml of the treatment liquid B were mixed, and the mixture was subjected to solid-liquid separation to obtain a residue E. The residue E was dried at 120° C. for 2 hours to obtain a positive electrode active material. The reason for heating at 90° C. or higher is that lithium raw material and ammonium peroxoniobate react with each other in the solution to thereby produce LiNbO according to the present invention, which tends to be adsorbed to the surface of the positive electrode active material.

The obtained positive electrode active material exhibited one peak in the range of from 0.145 nm to 0.185 nm, and also one peak in the range of from 0.28 nm to 0.31 nm.

For the obtained positive electrode active material, the value of B/A, the particle size $D_{50}$, the BET specific surface area, the moisture content (110° C. and 250° C.), and the discharge capacity were determined using the same method as in Example 1. Table 3 shows the results.

Example 12

62 g of LiOH—$H_2O$ and 6.4 g of ammonium peroxoniobate were dissolved in 450 ml of water to produce a treatment liquid. This treatment liquid is referred to as the treatment liquid A.

32 g of lithium sulfate was dissolved in 2000 ml of water to produce a treatment liquid. This treatment liquid is referred to as the treatment liquid B.

A spinel-type compound Li[$Ni_{0.4}Mn_{1.4}Ti_{0.2}]O_4$ was used as the core particle.

100 g of the core particle was added to the treatment liquid A, and the mixture was heated at 90° C. or higher and then subjected to solid-liquid separation to obtain a residue C. The residue C and 900 ml of the treatment liquid B were mixed, and the mixture was subjected to solid-liquid separation to obtain a residue D. The residue D and 900 ml of the treatment liquid B were mixed, and the mixture was subjected to solid-liquid separation to obtain a residue E. The residue E was dried at 200° C. for 2 hours to obtain a positive electrode active material. The reason for heating at 90° C. or higher is the same as in Example 12.

The obtained positive electrode active material exhibited one peak in the range of from 0.145 nm to 0.185 nm, and also one peak in the range of from 0.28 nm to 0.31 nm.

For the obtained positive electrode active material, the value of B/A, the particle size $D_{50}$, the BET specific surface area, the moisture content (110° C. and 250° C.), and the discharge capacity were determined using the same method as in Example 1. Table 3 shows the results.

Example 13

62 g of LiOH—$H_2O$ and 6.2 g of ammonium peroxoniobate were dissolved in 450 ml of water to produce a treatment liquid. This treatment liquid is referred to as the treatment liquid A.

32 g of lithium sulfate was dissolved in 2000 ml of water to produce a treatment liquid. This treatment liquid is referred to as the treatment liquid B.

A spinel-type compound Li[$Ni_{0.4}Mn_{1.4}Ti_{0.2}]O_4$ was used as the core particle.

100 g of the core particle were added to the treatment liquid A, and the mixture was heated at 90° C. or higher and then subjected to solid-liquid separation to obtain a residue C. The residue C and 900 ml of the treatment liquid B were mixed, and the mixture was subjected to solid-liquid separation to obtain a residue D. The residue D and 900 ml of the treatment liquid B were mixed, and the mixture was subjected to solid-liquid separation to obtain a residue E. The residue E was dried at 200° C. for 2 hours to obtain a positive electrode active material. The reason for heating at 90° C. or higher is the same as in Example 12.

The obtained positive electrode active material exhibited one peak in the range of 0.145 to 0.185 nm, and also one peak in the range of 0.28 to 0.31 nm.

In a cycle characteristic test in which a solid-state battery is charged at a current value of 0.33 C to 5.0 V, further charged at a constant voltage to a current value of 0.01 C, then discharged at 0.33 C to 3.0 V, and further discharged at a constant voltage to a current value of 0.01 C, this sample exhibited a discharge capacity of 113 mAh/g even in the $63^{-rd}$ cycle.

For the obtained positive electrode active material, the value of B/A, the particle size $D_{50}$, the BET specific surface area, the moisture content (110° C. and 250° C.), and the discharge capacity were determined using the same method as in Example 1. Table 3 shows the results.

TABLE 3

| Core particle | Ex. 11 Li[$Ni_{0.4}Mn_{1.4}Ti_{0.2}]O_4$ | Ex. 12 Li[$Ni_{0.4}Mn_{1.4}Ti_{0.2}]O_4$ | Ex. 13 Li[$Ni_{0.4}Mn_{1.4}Ti_{0.2}]O_4$ |
|---|---|---|---|
| Proportion of Nb in positive electrode active material (wt %) | 1.4 | 1.7 | 1.6 |
| $D_{50}$ (μm) | 3.8 | 3.8 | 3.7 |
| A: Specific surface area ($m^2g^{-1}$) | 3.2 | 2.1 | 2.2 |
| B: 110° C. moisture content (ppm) | 4022 | 914 | 1161 |
| 250° C. moisture content (ppm) | 5038 | 2060 | 2438 |
| Residual carbonate ions (wt %) | 0.09 | 0.19 | 0.22 |
| B/A | 1257 | 435 | 528 |
| Discharge capacity (mAh/g) | 126 | 128 | 123 |

As is clear from the results shown in Table 3, the solid-state batteries each including the positive electrode active materials obtained in Examples 11 to 13, which include a core particle made of a spinel-type compound, have a larger discharge capacity than that of Comparative Example 2.

The invention claimed is:

1. An active material for use in a solid-state battery, exhibiting at least one peak in a range of from 0.145 nm to 0.185 nm and at least one peak in a range of from 0.28 nm to 0.31 nm in a radial distribution function obtained through measurement of an X-ray absorption fine structure of the active material, wherein the active material comprises a core particle and a coating layer located on a surface of the core particle, the core particle comprises a lithium-metal complex oxide, the lithium-metal complex oxide comprises a layered rock salt-type compound or a spinel-type compound, the coating layer comprises an oxide containing Li and Nb, the active material has a BET specific surface area A of 0.5 m$^2$/g or more and 5.0 m$^2$/g or less, a ratio B/A is from 308 to 778 when the lithium-metal complex oxide is a layered rock salt-type compound, and from 223 to 1257 when the lithium-metal complex oxide is a spinel-type compound, wherein A represents the BET specific surface area and B represents a moisture content (mass ppm) as measured up to 110° C. by the Karl-Fischer method, a proportion of the oxide contained in the active material, in terms of a ratio of a mass of niobium to a mass of the active material is at least 0.01% by mass and at most 3% by mass, and an amount of carbonic acid ions on a surface of the active material is less than 2.0% by mass, based on the active material.

2. A positive electrode material mixture comprising the active material according to claim 1, and a sulfide solid electrolyte.

3. The positive electrode material mixture according to claim 2, wherein the sulfide solid electrolyte contains elements Li and S, and has lithium ion conductivity.

4. The positive electrode material mixture according to claim 3, wherein the sulfide solid electrolyte has a crystal phase of an argyrodite structure.

5. A solid-state battery comprising a positive electrode layer, a negative electrode layer, and a solid electrolyte layer, the positive electrode layer containing the positive electrode material mixture according to claim 4.

6. A solid-state battery comprising a positive electrode layer, a negative electrode layer, and a solid electrolyte layer, the positive electrode layer containing the positive electrode material mixture according to claim 3.

7. A solid-state battery comprising a positive electrode layer, a negative electrode layer, and a solid electrolyte layer, the positive electrode layer containing the positive electrode material mixture according to claim 2.

8. A positive electrode material mixture comprising the active material according to claim 1, and a sulfide solid electrolyte.

9. The positive electrode material mixture according to claim 8, wherein the sulfide solid electrolyte contains elements Li and S, and has lithium ion conductivity.

10. A solid-state battery comprising a positive electrode layer, a negative electrode layer, and a solid electrolyte layer, the positive electrode layer containing the positive electrode material mixture according to claim 8.

11. The active material according to claim 1, wherein the active material has a volume cumulative particle size $D_{50}$, which is a particle size at a cumulative volume 50% in the laser diffraction scattering particle size distribution analysis, of greater than 1 μm and at most 20 μm.

* * * * *